(12) United States Patent
Wang et al.

(10) Patent No.: US 11,635,540 B2
(45) Date of Patent: Apr. 25, 2023

(54) METHODS AND DEVICES PERFORMING ADAPTIVE QUADRATIC WASSERSTEIN FULL-WAVEFORM INVERSION

(71) Applicant: CGG SERVICES SAS, Massy (FR)

(72) Inventors: Diancheng Wang, Houston, TX (US); Ping Wang, Sugarland, TX (US)

(73) Assignee: CGG SERVICES SAS, Massy (FR)

( * ) Notice: Subject to any disclaimer, the term of this patent is extended or adjusted under 35 U.S.C. 154(b) by 394 days.

(21) Appl. No.: 16/662,644

(22) Filed: Oct. 24, 2019

(65) Prior Publication Data
US 2020/0309980 A1 Oct. 1, 2020

Related U.S. Application Data

(60) Provisional application No. 62/823,898, filed on Mar. 26, 2019.

(51) Int. Cl.
| | |
|---|---|
| *G06F 30/20* | (2020.01) |
| *G01V 1/32* | (2006.01) |
| *G01V 1/30* | (2006.01) |
| *G01V 99/00* | (2009.01) |
| *G06F 111/10* | (2020.01) |

(52) U.S. Cl.
CPC ............. *G01V 1/32* (2013.01); *G01V 1/301* (2013.01); *G01V 1/303* (2013.01); *G01V 99/005* (2013.01); *G06F 30/20* (2020.01); *G06F 2111/10* (2020.01)

(58) Field of Classification Search
CPC .......... G06F 30/20; G01V 1/32; G01V 1/301; G01V 1/303; G01V 99/005

USPC .............................................. 703/2
See application file for complete search history.

(56) References Cited

U.S. PATENT DOCUMENTS

| | | | | |
|---|---|---|---|---|
| 7,072,767 | B2* | 7/2006 | Routh | G01V 1/28 |
| | | | | 702/14 |
| 2004/0186667 | A1* | 9/2004 | Lee | G01V 1/30 |
| | | | | 702/14 |
| 2017/0168177 | A1* | 6/2017 | Wang | G01V 1/282 |
| 2018/0017690 | A1* | 1/2018 | Tan | G01V 1/282 |
| 2019/0086564 | A1* | 3/2019 | Shen | G01V 1/282 |

FOREIGN PATENT DOCUMENTS

WO     2019162402 A1    8/2019

OTHER PUBLICATIONS

Engquist et al. (Seismic Inversion and the Data Normalization for Optimal Transport, (23 pages)). (Year: 2018).*
Search Report for related Great Britain Application No. GB2003661. 2, dated Aug. 21, 2020. (The Qui et al. Yeference cited in the Search Report was already cited in the IDS filed Oct. 24, 2019.).

(Continued)

*Primary Examiner* — Andre Pierre Louis
(74) *Attorney, Agent, or Firm* — Patent Portfolio Builders PLLC

(57) ABSTRACT

Methods and devices for seismic exploration of an underground structure apply $W^2$-based full-wave inversion to transformed synthetic and seismic data. Data transformation ensures that the synthetic and seismic data are positive definite and have the same mass using an adaptive normalization. This approach yields superior results particularly when the underground structure includes salt bodies.

20 Claims, 9 Drawing Sheets

(56) References Cited

OTHER PUBLICATIONS

Nang, D., et al., "Adaptive quadratic Wasserstein full-waveform inversion," 2019 SEG International Exposition and 89th Annual Meeting, San Antonio, USA, Sep. 15-20, 2019 (Presented Sep. 17, 2019), pp. 1300-1304.

Engquist, B., et al., "Optimal Transport for Seismic Full Waveform Inversion," arXiv:1602.01540v2 [physics.geo-ph], Apr. 19, 2016 (Published online Apr. 18, 2016), p. 1 23.

Gomes, A., et al., "Extending the reach of FWI with reflection data: Potential and challenges," SEG International Exposition and 87th Annual Meeting, 2017 SEG, Sep. 24-27, 2017 (Published Jun. 12, 2017), pp. 1454-1459.

Gomes, A., et al., "Improving reflection FWI reflectivity using LSRTM in the curvelet domain," SEG International Exposition and 88th Annual Meeting, 2018 SEG, Oct. 14-19, 2018 (Presented Oct. 18, 2018), pp. 1248-1252.

Jiao, K., et al., "Adjustive full waveform inversion," SEG New Orleans Annual Meeting, 2015 SEG, Oct. 18-23, 2015, pp. 1091-1095.

Lu, R., et al., "Revealing overburden and reservoir complexity with high-resolution FWI," SEG International Exposition and 86th Annual Meeting, 2016 SEG, Oct. 16-21, 2016 (Presented Oct. 18, 2016), pp. 1242-1246.

Métivier, L., et al., "Measuring the misfit between seismograms using an optimal transport distance: application to full waveform inversion," Geophysical Journal International, vol. 205, Issue 1, Apr. 2016 (Published Feb. 24, 2016), pp. 345-377.

Poncet, R., et al., "FWI with Optimal Transport: a 3D Implementation and an Application on a Field Dataset," 80th EAGE Conference & Exhibition 2018, Copenhagen, Denmark, Jun. 11-14, 2018 (Published Jun. 11, 2018), 5 pages.

Qiu, L., et al., "Full waveform inversion with an exponentially-encoded optimal transport norm," SEG International Exposition and 87th Annual Meeting, 2017 SEG, Sep. 24-27, 2017 (Presented Sep. 25, 2017), pp. 1286-1290.

Ramos-Martinez, J., et al., "Long-wavelength FWI updates beyond cycle skipping," SEG International Exposition and 88th Annual Meeting, 2018 SEG, Oct. 14-19, 2018 (Presented Oct. 17, 2018), pp. 1168-1172.

Shen, X., et al., "High resolution Full Waveform Inversion for structural imaging in exploration," SEG International Exposition and 88th Annual Meeting, 2018 SEG, Oct. 14-19, 2018 (Presented Oct. 16, 2018), pp. 1098-1102.

Tarantola, A., "Inversion of seismic reflection data in the acoustic approximation," Geophysics, vol. 49, No. 8, Aug. 1984, pp. 1259-1266.

Wang, P., et al., "A demigration-based reflection full-waveform inversion workflow," SEG International Exposition and 88th Annual Meeting, 2018 SEG, Oct. 14-19, 2018 (Presented Oct. 16, 2018), pp. 1138-1142.

Wang, P., et al., "Full-waveform inversion for salt: A coming of age," The Leading Edge, vol. 38, Issue 3, Mar. 2019, pp. 204-213.

Warner, M., et al., "Adaptive waveform inversion: Theory," Geophysics, vol. 81, No. 6, Nov.-Dec. 2016 (Published online Sep. 21, 2016; corrected version published online Nov. 21, 2016), pp. R429-R445 (20 pages total).

Yang, Y., et al., "Application of optimal transport and the quadratic Wasserstein metric to full-waveform inversion," Geophysics, vol. 83, No. 1, Jan.-Feb. 2018 (Published ahead of production Oct. 10, 2017; published online Jan. 5, 2018), pp. R43-R62.

Zhang, Z., et al., "Correcting for salt misinterpretation with full-waveform inversion," SEG International Exposition and 88th Annual Meeting, 2018 SEG, Oct. 14-19, 2018, pp. 1143-1147.

R.-E. Plessix, "A review of the adjoint-state method for computing the gradient of a functional with geophysical applications," Geophysical Journal International, Nov. 2006, pp. 495-503, vol. 167, Issue 2.

\* cited by examiner

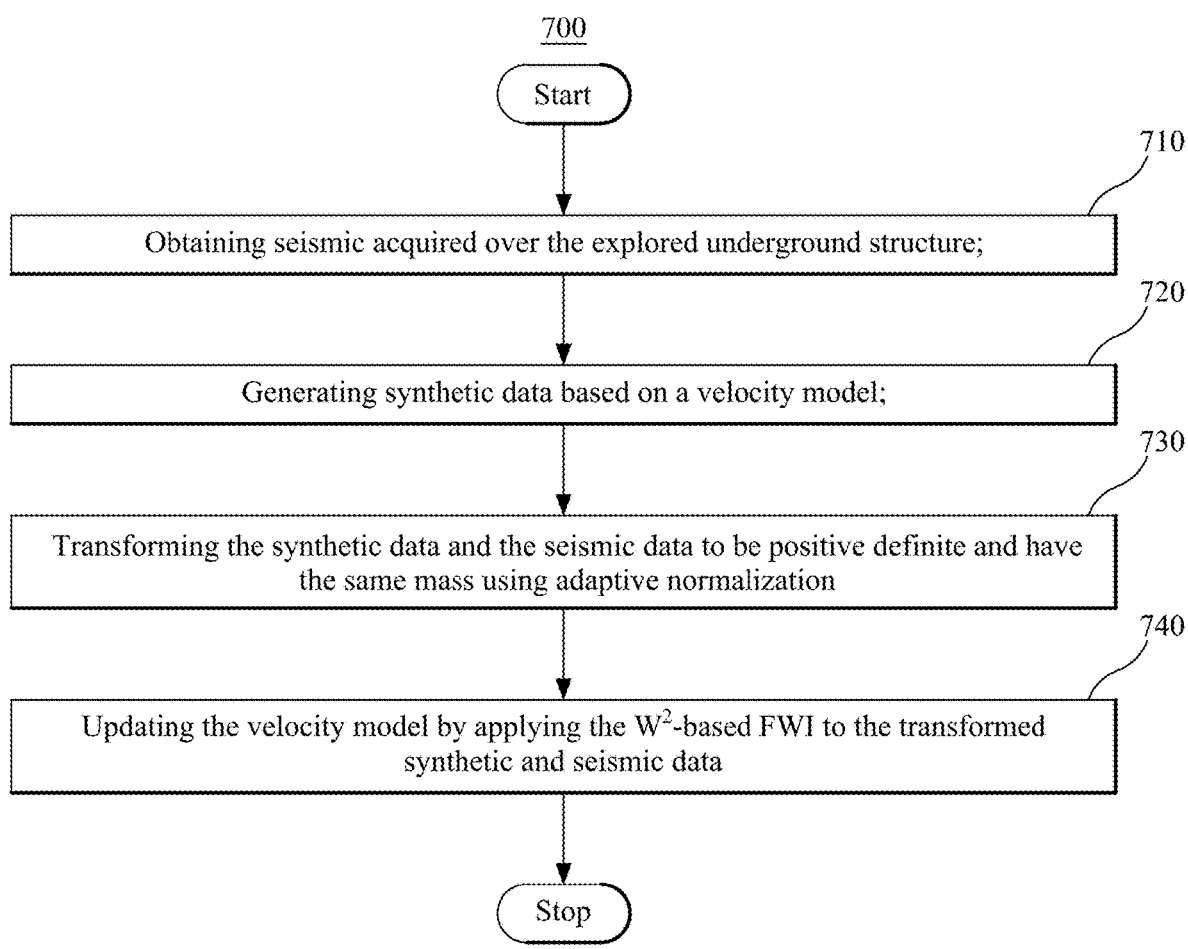

METHODS AND DEVICES PERFORMING ADAPTIVE QUADRATIC WASSERSTEIN FULL-WAVEFORM INVERSION

BACKGROUND

Technical Field

Embodiments of the subject matter disclosed herein generally relate to methods and devices for seismic exploration of an underground structure using a full-waveform inversion (FWI) technique; more particularly, to using adaptive quadratic Wasserstein FWI.

Discussion of the Background

Seismic data representing acoustic waves emerging from an underground geophysical structure (which may be under the water bottom) are processed to generate a profile (image) of the geophysical structure. This profile is used to assess the likelihood that oil and gas or other natural resources are present in the structure. Obtaining a high-resolution image of the structure that enables locating the sought-after natural resources is an ongoing objective of seismic exploration.

Seismic data is generated by receivers which sample amplitude of detected seismic waves that have interacted with the explored geophysical structure. The interaction of seismic waves with an explored geophysical structure includes reflection, refraction, diffraction, attenuation, etc. The receivers record series of amplitude-versus-time samples, which series are known as traces. During seismic data processing, the recorded traces are converted into images, which may be a set of attribute values (such as velocity, density, etc.) associated with three-dimensional volumes inside the explored geophysical structure. Some of the attribute values may indicate a likely presence of oil and/or gas.

Seismic data processing may yield a velocity model of the explored geophysical structure associating propagation velocity with volumes thereof. Refraction and reflection may occur at an interface between volumes with different propagation velocities. The better defined the velocity volumes and the more accurate the propagation velocity values are, the better is the seismic image quality.

FWI techniques iteratively update a model of the explored geophysical structure so as to minimize the difference between synthetic data generated based on a current model and the recorded seismic data. Given FWI's recognized potential to produce accurate and high-resolution velocity (or other geophysical attributes) models, FWI research has been intense, with various FWI approaches proposed and investigated.

FWI is a highly complex non-linear problem with various intertwined challenges, such as:
  cycle-skipping, which often traps the FWI updated model at a local minimum,
  amplitude-mismatching, which may be due to noise in real data and/or the modeling engine approximating real-world wave propagation, and
  solving a highly under-determined problem, the problem being under-determined due to limited acquisition (e.g., offset limited).

Updating models that include salt bodies using conventional FWI is plagued by both cycle-skipping and amplitude-mismatch issues. Salt body misinterpretation often causes large velocity errors that, in turn, result in severe cycle-skipping. Due to the strong contrast of salt body's boundaries, the amplitudes of reflected or refracted waves at interfaces with a salt body are difficult to model correctly.

Some conventional FWI-based methods that use the least-squares metric ($L^2$) to measure the difference between synthetic data and recorded seismic data turned out to be prone to both cycle-skipping and amplitude-mismatching because the misfit is based on a pointwise amplitude difference. Other conventional FWI methods that have employed different approaches (e.g., the travel-time difference) have shown promising success. These latter methods use cost functions that downplay the amplitude effects and emphasize low frequency to avoid cycle-skipping.

However, the conventional FWI-based methods using travel-time cost functions remain difficult when data acquisition is limited. The conventional FWI methods work well for diving waves (e.g., for ocean-bottom nodes, which provide good illumination and angle coverage within their penetration depth) but not when long offsets are missing, such as in the case of streamer data acquisition. It has therefore been attempted using reflection energies for deep velocity updating. To properly utilize the reflection energy for FWI, a scale separation procedure (by either decomposition or demigration) has to be employed to separate the tomographic term from the migration term of the gradient. The tomographic term of the gradient, which represents kinematic information, is relevant to velocity errors and, therefore, is kept for velocity updating. Recent progress in reflection FWI (RFWI) has demonstrated its effectiveness in improving image focus and gather quality. Nonetheless, the under-determination problem and the so-called "depth-velocity ambiguity" issue persist in RFWI.

The 2016 article, "Optimal transport for seismic full waveform inversion," by Engquist et al. (published in *Communications in Mathematical Sciences*, 14, pp. 2309-2330) has attracted considerable attention for its potential use in the FWI context. Wasserstein distance discussed therein is a measure used to find a transport map that matches two mass densities in a cost-efficient way. Wasserstein distance encodes both the travel-time and amplitude information, being therefore a desirable replacement for the $L^2$ metric in FWI. Wasserstein distance's superior mathematical properties, including good convexity and insensitivity to amplitude distortions, makes it well-suited for tackling the above-discussed FWI challenges.

The 2016 article, "Measuring the misfit between seismograms using an optimal transport distance: Application to full waveform inversion," by Métivier et al. proposes an FWI problem formulation based on the 1-Wasserstein ($W^1$) metric approximated by the Kantorovich-Rubinstein norm. The 2018 article, "Application of optimal transport and the quadratic Wasserstein metric to full-waveform inversion," by Yang et al. (published in *Geophysics*, 83(1), pp. R43-R62) articulates an FWI problem formulation based on the 2-Wasserstein ($W^2$) metric. Numerical simulations for both these formulations have shown that optimal transport can effectively mitigate cycle-skipping issues. However, existing Wasserstein (metric-based FWI methods are still plagued by other limitations discussed above, especially for salt velocity updating (as discussed, for example, in the 2018 article, "FWI with optimal transport: a 3D implementation and an application on a field dataset," by Poncet et al., published in 80th Conference and Exhibition, EAGE, Extended Abstracts, We A12 02, or the 2018 article, "Full-waveform inversion with an exponentially encoded optimal-transport norm," by Ramos-Martinez et al., published in 87th Annual International Meeting, SEG, Expanded Abstracts, pp. 1286-1290).

There is a need to further develop methods and devices that take advantage of the Wasserstein metric in the FWI context while also mitigating the above-identified persisting challenges so as to obtain more accurate images of seismically explored geophysical structures, in particular the ones including salt bodies.

SUMMARY

Various embodiments use an adaptive quadratic Wasserstein metric (i.e., $W^2$ distance) to further advance the effectiveness of optimal transport FWI. To properly apply the $W^2$ metric, both the synthetic and real data need to be normalized so as to satisfy positivity and mass-conservation requirements.

According to an embodiment, there is a method for seismic exploration of an underground structure using a $W^2$-based full-wave inversion. The method includes obtaining seismic acquired over the explored underground structure, generating synthetic data based on a velocity model, and transforming the synthetic data and the seismic data to be positive definite and to have a same mass using an adaptive normalization. The method further includes updating the velocity model by applying the $W^2$-based FWI to the transformed synthetic and seismic data. The updated velocity model is usable to determine presence of natural resources in the explored underground structure.

According to another embodiment there is a seismic data processing apparatus configured to perform seismic exploration of an underground structure using a $W^2$-based FWI. The apparatus includes an interface configured to obtain seismic data acquired over the explored underground structure and a data processing unit connected to the interface. The data processing unit is configured to generate synthetic data based on a velocity model, to transform the synthetic data and the seismic data to be positive definite and to have a same mass using an adaptive normalization, and to update the velocity model by applying the $W^2$-based FWI to the transformed synthetic and seismic data. The updated velocity model is usable to determine presence of natural resources in the explored underground structure.

According to yet another embodiment there is a computer readable storage medium storing executable codes, which, when executed by a processor, make the processor perform a method of seismic exploration of an underground structure using a $W^2$-based FWI. The method includes obtaining seismic acquired over the explored underground structure, generating synthetic data based on a velocity model, and transforming the synthetic data and the seismic data to be positive definite and to have a same mass using an adaptive normalization. The method further includes updating the velocity model by applying the $W^2$-based FWI to the transformed synthetic and seismic data. The updated velocity model is usable to determine presence of natural resources in the explored underground structure.

BRIEF DESCRIPTION OF THE DRAWINGS

For a more complete understanding of the present inventive concept, reference is now made to the following descriptions taken in conjunction with the accompanying drawings, in which:

FIG. 7 is a flowchart of a method according to an embodiment; and

DETAILED DESCRIPTION OF THE INVENTION

Figure 1:
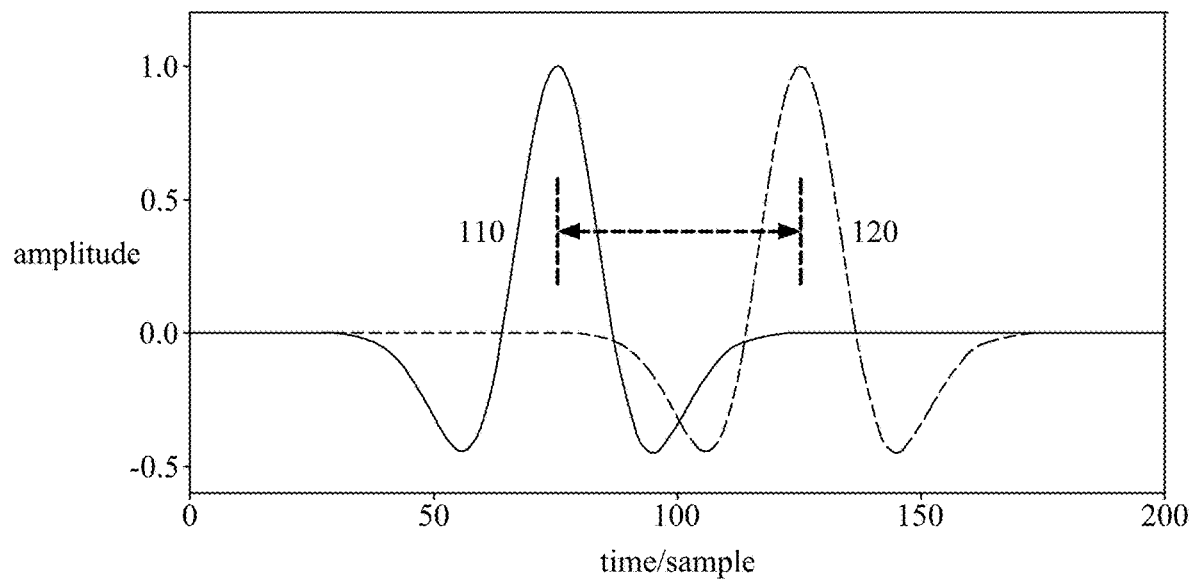
FIG. 1 is a graph illustrating a synthetic trace and a real data trace.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using the terminology of seismic data processing for exploring underground structures, in particular, related to FWI methods based on the Wasserstein metric.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The quadratic Wasserstein metric (also known as $W^2$ distance) is computed trace-by-trace for the synthetic data f and real data g, considered to be two density distributions defined on the same domain:

$$W^2(f, g) = \int_0^T |t - G^{-1}(F(t))|^2 f(t) dt \quad (1)$$

where $F(t) = \int_0^t f(s)ds$, $G(t) = \int_0^t g(s)ds$.

Formula (1) can also be expressed in matrix form:

$$W^2(f, g) = (t - G^{-1}(F(t)))^T \mathrm{diag}(f)(t - G^{-1}(F(t))). \quad (2)$$

A Frechet derivative with respect to the synthetic data f (i.e., the adjoint source) has to be computed in order to apply the $W^2$-based cost function within the FWI framework. The adjoint-state method is a general framework for FWI, not specific to W2-based FWI. Different cost function metrics, such as, the conventional L2 or W2 may be used within this framework (as described, for example, in the 2006 article "A review of the adjoint-state method for computing the gradient of a function with geophysical application" by Plessix R.-E. published in *Geophysical Journal international*, 167 (2), pp. 495-503).

The adjoint source may be computed according to the following formula:

$$\nabla W^2 = \left[ -2\mathrm{diag}\left(\frac{dG^{-1}(y)}{dy}\bigg|_{F(t)}\right) U \mathrm{diag}(f) + \mathrm{diag}(t - G^{-1}(F(t))) \right] \quad (3)$$

$$(t - G^{-1}(F(t)))$$

-continued where $$\left(\frac{dG^{-1}(y)}{dy}\bigg|_{F(t)}\right) = \frac{1}{g(G^{-1}(F(t)))} \quad (4)$$

and U is the upper triangle matrix.

The adjoint source is then back-propagated to compute the gradient according to the adjoint-state method.

For the $W^2$-based FWI to work properly, the density distributions f and g have to satisfy two conditions: positivity and mass conservation. Both f and g have to be positive everywhere (i.e., f>0, g>0), and their total masses must be equal (i.e., $\int_0^T f = \int_0^T g$). Seismic data intrinsically has both positive and negative parts, and there is no guarantee that the total masses of synthetic and real data are equal. Therefore, normalization is necessary before applying the $W^2$ metric. Various normalization techniques have been discussed in literature (for example, in the 2017 article, "Full-waveform inversion with an exponentially encoded optimal-transport norm," by Qui et al., published in 87th Annual International Meeting, SEG, Expanded Abstracts, 1286-1290, or the 2018 article, "Application of optimal transport and the quadratic Wasserstein metric to full-waveform inversion," by Yang et al., published in *Geophysics*, 83(1), R43-R62), with each technique having its advantages and drawbacks.

Linear normalization seems most reliable when dealing with real data. The drawback of linear normalization is that it weakens the convexity of the $W^2$ cost function. The following transformation may be applied to the seismic data before linear normalization to mitigate this problem:

$$\tilde{f}(t) = \int_0^t f(s)ds - \int_0^t g(s)ds, \tilde{g}(t) = 0. \quad (5)$$

Here, $\tilde{f}(t)$ which is the integrals over the wavefields difference better promotes low frequency. The wavefield represents the sound wave amplitudes that travel through the subsurface earth after a shot is fired (i.e., a 4D volume of values in spatial (x, y, z) and time surveyed). A seismic trace is obtained by detecting (i.e., sampling amplitude of) these waves using receivers at a specific surface position (receiver position) for the recorded period of time. In other words, a trace is a projection of the wavefield to a particular position and along the time axis. Integrating the wavefield means integrating along the time dimension. This can be done on the trace or on the wavefield directly.

An adaptive linear normalization is then applied to the transformed traces $\tilde{f}$ and $\tilde{g}$ to handle weak events and amplitude mismatch:

$$\hat{f} \equiv \frac{\tilde{f}+c}{<\tilde{f}+c>}, \hat{g} \equiv \frac{\tilde{g}+c}{<\tilde{g}+c>}, \quad (6)$$

where c is a normalization constant that ensures $\tilde{f}+c>0$ and $\tilde{g}+c>0$. Amplitude normalization yields a better handling of weak events and alleviates the negative effect of amplitude mismatches.

The normalized signals $\hat{f}$ and $\hat{g}$ are used in equations (1)-(3) for FWI velocity updating.

Figure 2:
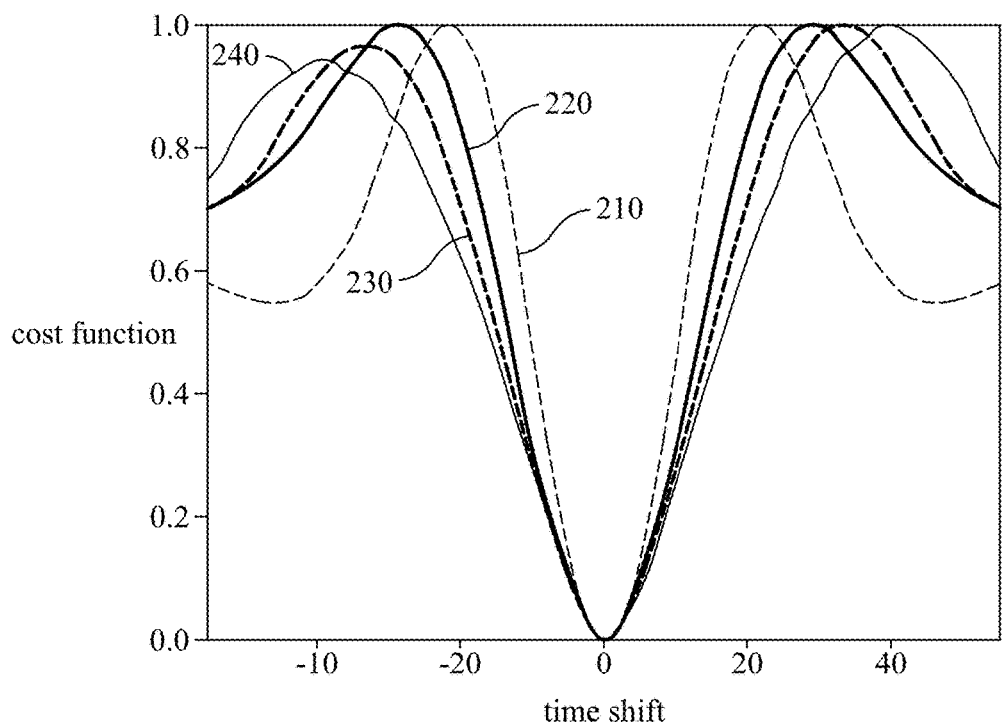
FIG. 2 is a graph illustrating cost functions versus time shift.
Figure 3:
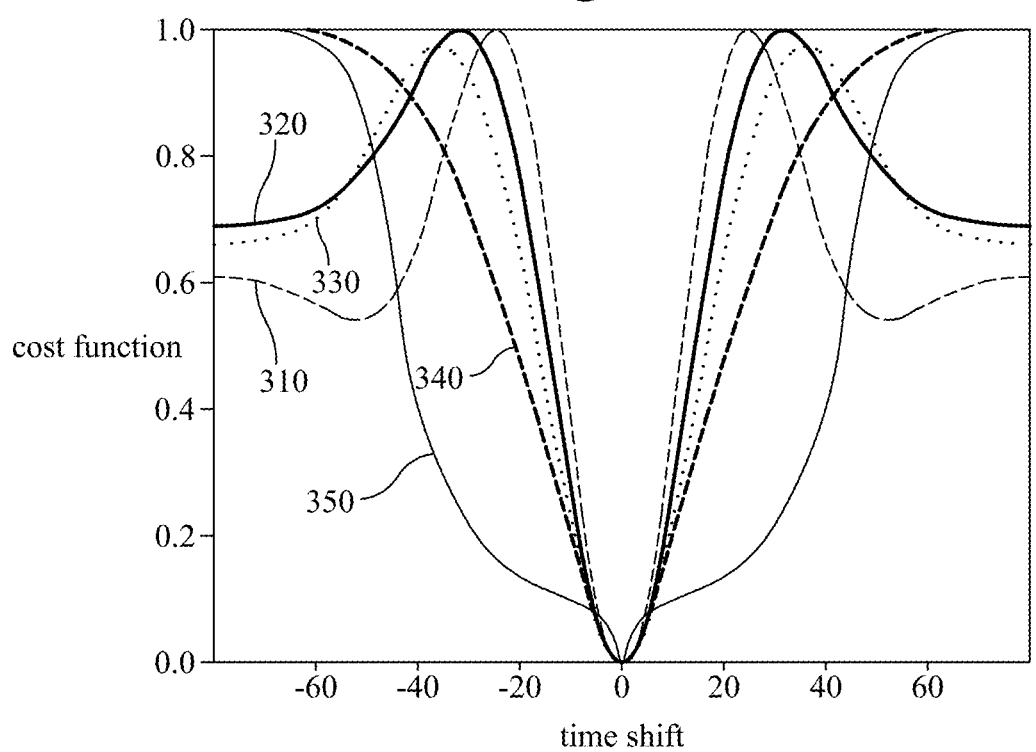
FIG. 3 is another graph representing cost functions versus time shift.

Thus, the data transformation performed prior to applying $W^2$-based FWI includes two procedures: (A) integrating the wavefields, and (B) adaptive normalization. Integrating the wavefield boosts low frequency, thereby enhancing convexity. Adaptive normalization means subtracting the integrated signals and matching the subtracted result to a trace with an average amplitude of zero. FIGS. 1-3 illustrate these operations.

The graph in FIG. 1 represents a synthetic trace 110 and a real data trace 120 (which are two identical Ricker wavelets) separated by a certain time shift. The graph in FIG. 2 represents the $W^2$-based cost function plotted as a function of the time shift. Specifically, curve 210 is the $L^2$-based cost function, curve 220 is the $W^2$-based cost function with c=5, curve 230 is the $W^2$-based cost function with c=1, and curve 240 is the $W^2$-based cost function with c=0.5. The $W^2$-based cost function with simple linear normalization loses global convexity, but remains better than the $L^2$-based cost function. In addition, the convexity of the $W^2$-based cost function weakens as the normalization constant c increases. Therefore, constant c is preferably as small as possible while still satisfying the positivity requirement.

The adaptive normalization performed according to equation (5) allows using a smaller c by removing a large part of the energy from the traces. This benefit becomes clearer when the real seismic traces contain multiple events, with some significantly stronger than others. Adaptive normalization effectively removes the already matched events, which are usually strong, from the problem and gradually emphasizes the weaker events. This allows a smaller c value and boosted convexity.

The graph in FIG. 3 illustrates the overall benefit brought by the adaptive normalization. Curve 310 represents the $L^2$-based cost function without integral wavefield and curve 320 represents the $L^2$-based cost function with integral wavefield. Curve 330 represents the $W^2$-based cost function without integral wavefield and adaptive normalization, curve 340 improved represents the $W^2$-based cost function with integral wavefield but without adaptive normalization, and curve 350 represents the $W^2$-based cost function with integral wavefield and adaptive normalization. By comparing curves 310 with 320 and curve 330 with 340 and 350, one notes that integral wavefield enhances the convexity for both metrics.

The adaptive quadratic Wasserstein FWI approach responds to the cycle skipping challenge by enhancing convexity via integral wavefield, and to the amplitude challenge by reducing amplitude sensitivity upon using adaptive normalization.

Figure 4:
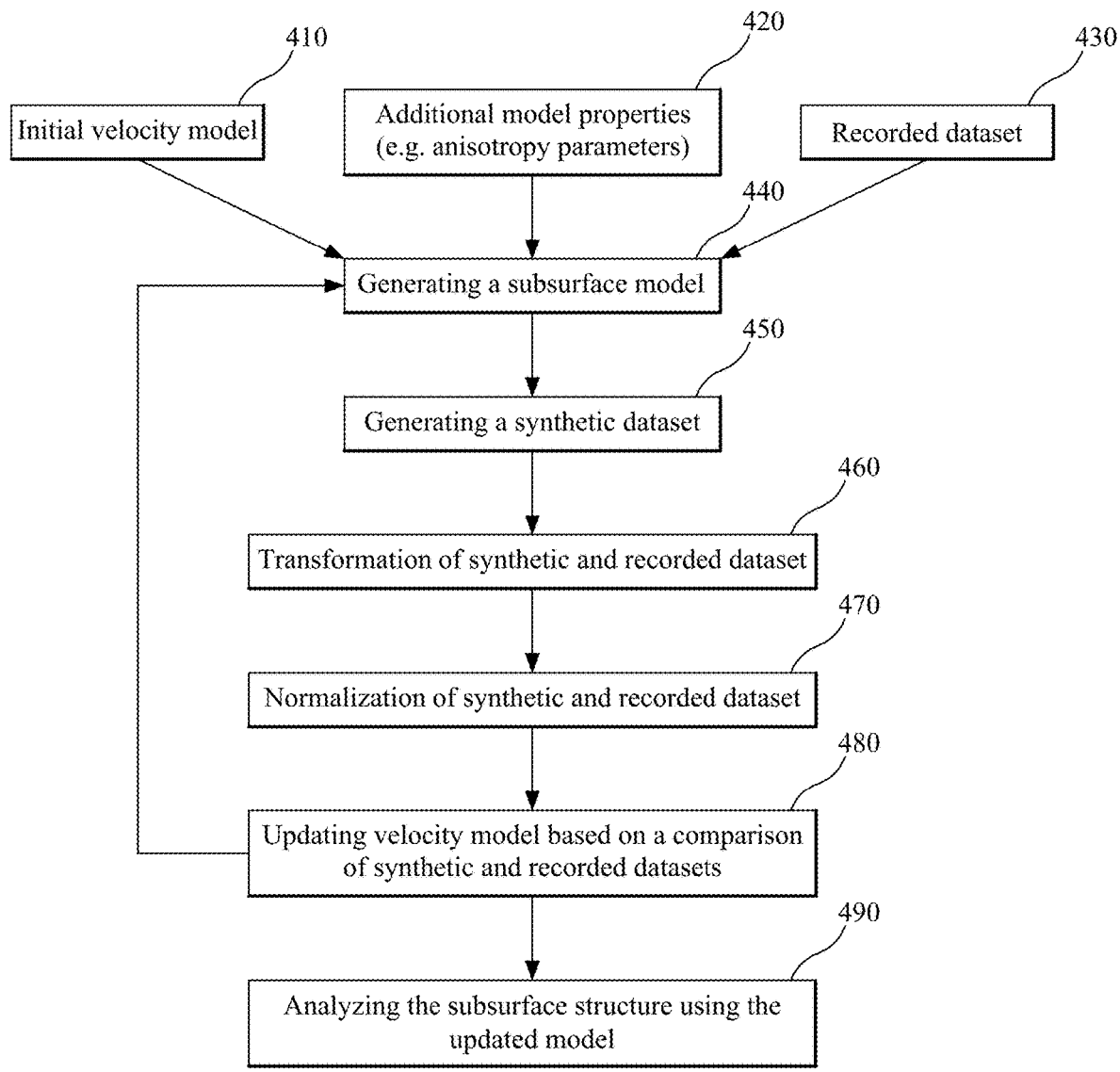
FIG. 4 is a dataflow according to an embodiment.

FIG. 4 is a dataflow according to an embodiment. The initial velocity model 410 may be based on newly acquired seismic data and/or well data or on historic data from previous seismic exploration in the same area. Optional additional properties 420 may include other factors, such as anisotropic parameters, elastic parameters, etc. The recorded dataset 430 may include, for example, the geometry of the acquisition layout in addition to the seismic data. Inputs 410, 420 and 430 are used to generate a subsurface model of the underground structure at 440. The subsurface model specifies location of interfaces between volumes with different seismic wave propagation velocities, each interface being associated with a reflection coefficient that characterizes reflection and refraction occurring when a seismic wave is incident to an interface.

Steps 440-480 codify the adaptive quadratic Wasserstein FWI and may then be performed (looped over) multiple times. The decision of whether or not to reiterate these steps is based on whether the $W^2$-based cost function calculated at 480 has decreased below a predetermined threshold. At 490 a velocity model of the geophysical structure is output; if migration (e.g., reverse time migration of data using this velocity model) is applied to this velocity model then an image of the geophysical structure is obtained. Analysis of the image can suggest, to those trained in the field, the presence or absence of oil and/or gas among other natural resources inside the geophysical structure.

Figure 5A:
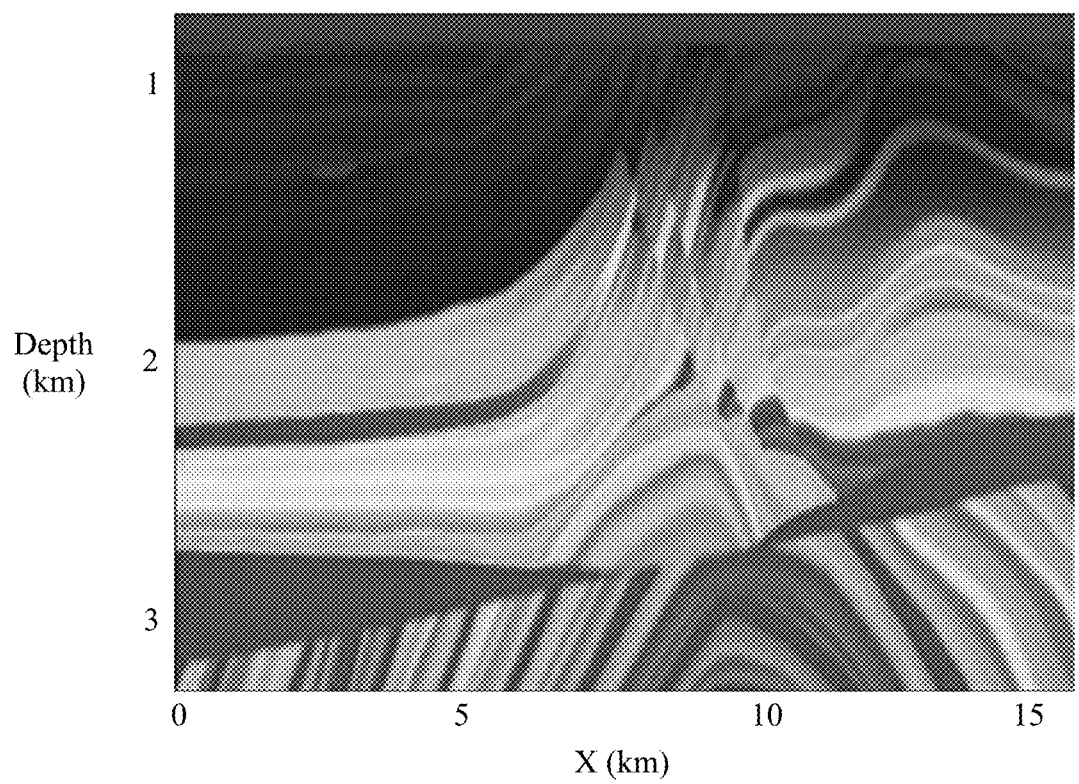
FIGS. 5A-5D are graphs illustrating the benefit of applying the $W^2$-based FWI according to an embodiment to model data.
Figure 5B:
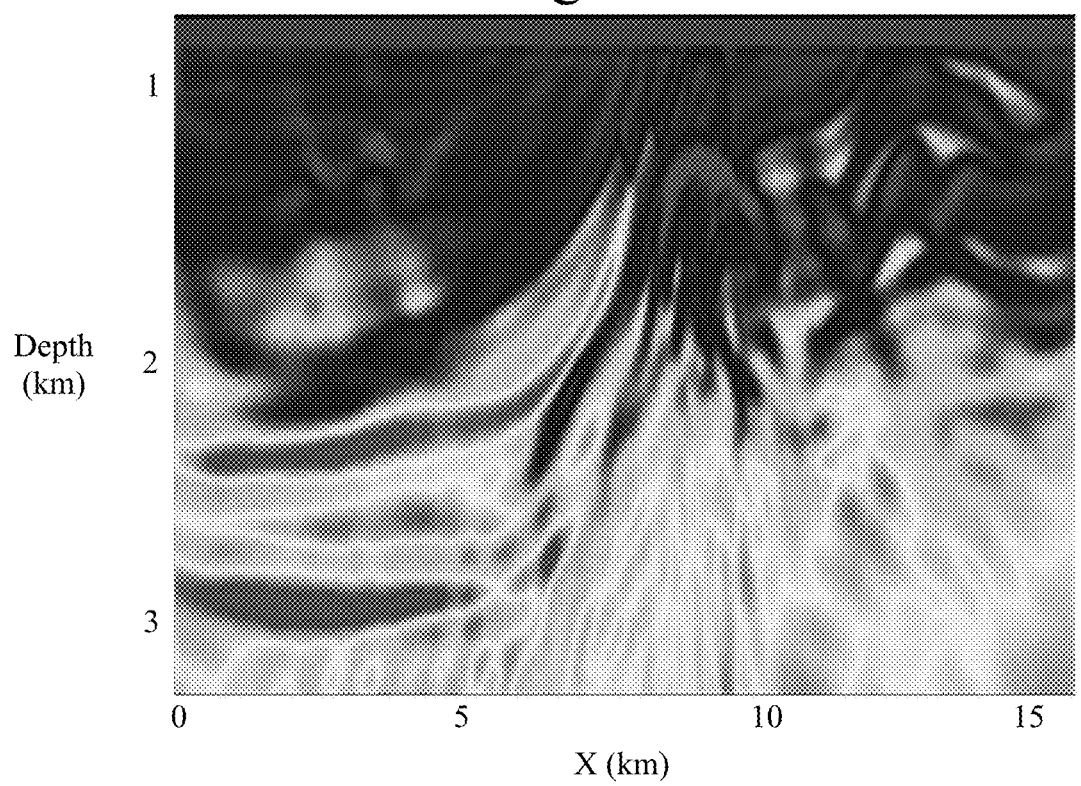
Figure 5C:
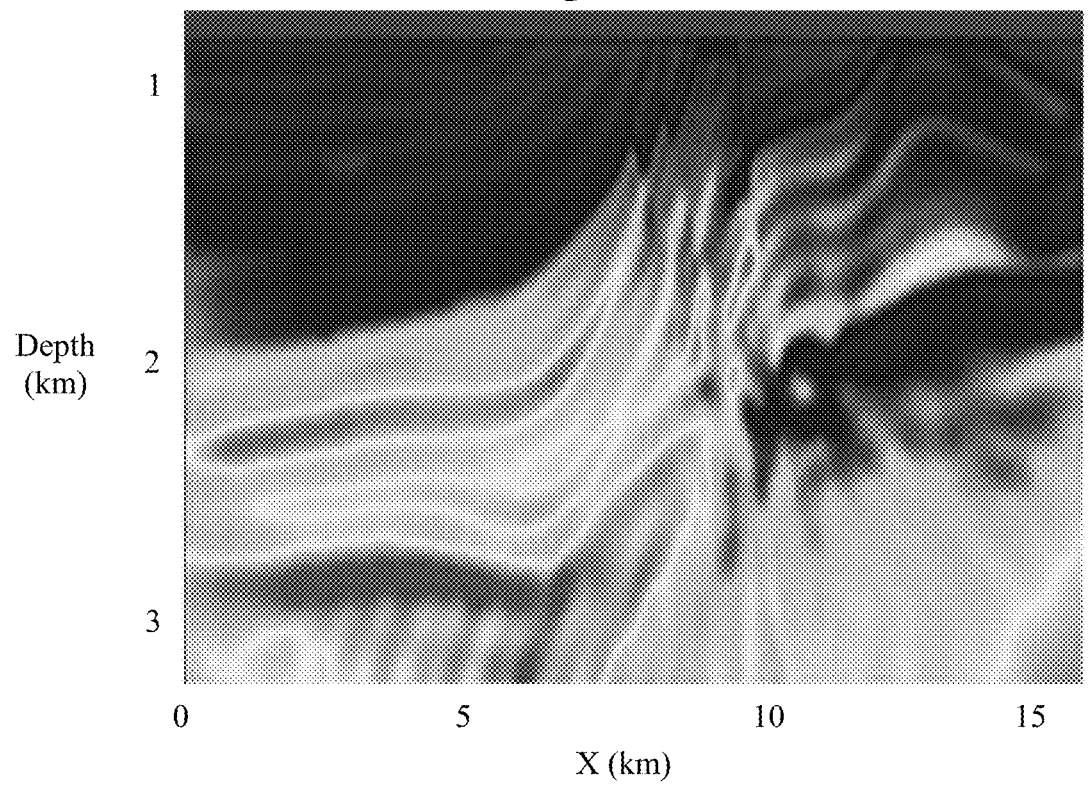
Figure 5D:
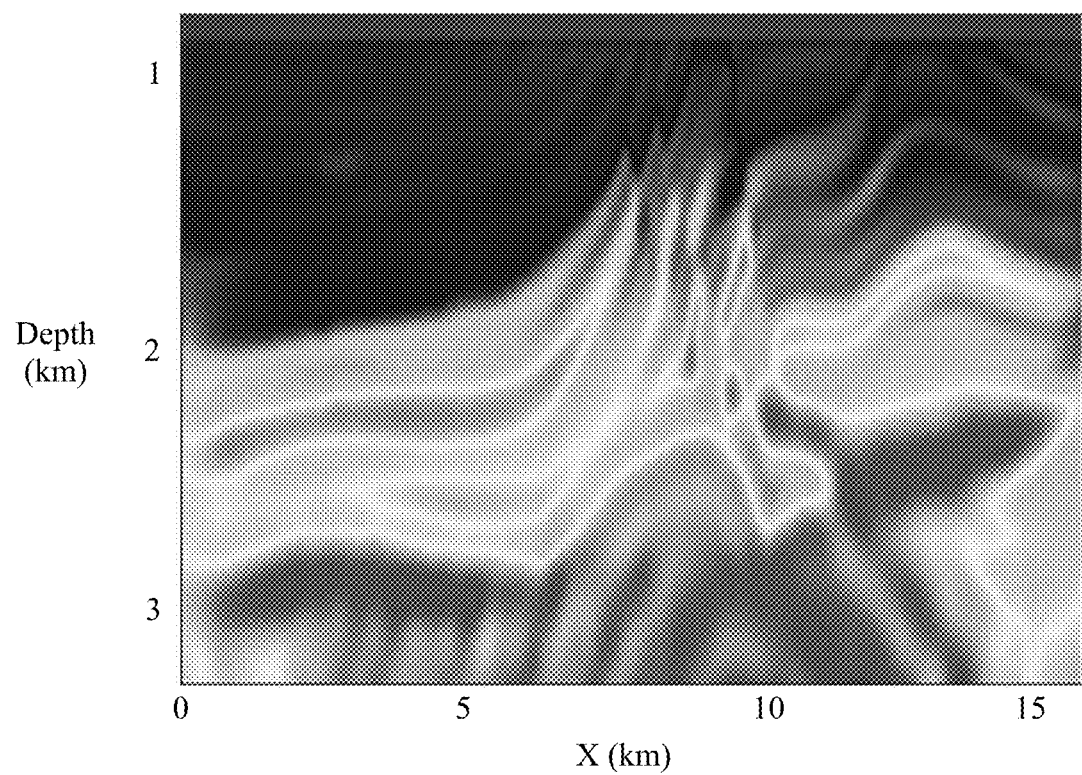

FIGS. 5A-5D illustrate data processing of Marmousi model-based data (i.e., synthetic data) used to validate the above-described approach. FIGS. 5A-5D are four two-dimensional (2D) graphs, each having a horizontal dimension (of about 15 km) on x-axis, depth (down to 3 km) on y-axis and velocity in a range of 1,450 to 4,500 m/s illustrated as nuances of gray. A Ricker wavelet peaked at 4 Hz was used to generate the synthetic shots, with a fixed-spread acquisition geometry covering the model. FIG. 5A is the Marmousi model, FIG. 5B is the result of $L^2$-based FWI, FIG. 5C is the result of a simple (i.e., no integral wavefield and adaptive normalization) $W^2$-based FWI, and FIG. 5D is the result of $W^2$-based FWI with adaptive normalization and integral wavefield. The FWIs were carried out at a single frequency of 6 Hz, with a 1D initial velocity model v(z). The $L^2$-based FWI is severely cycle-skipped. Simple $W^2$-based FWI has alleviated the cycle-skipping issue to some extent, but $W^2$-based FWI with integral wavefield and adaptive normalization better recovers the model, thanks to its superior convexity.

Figure 6A:
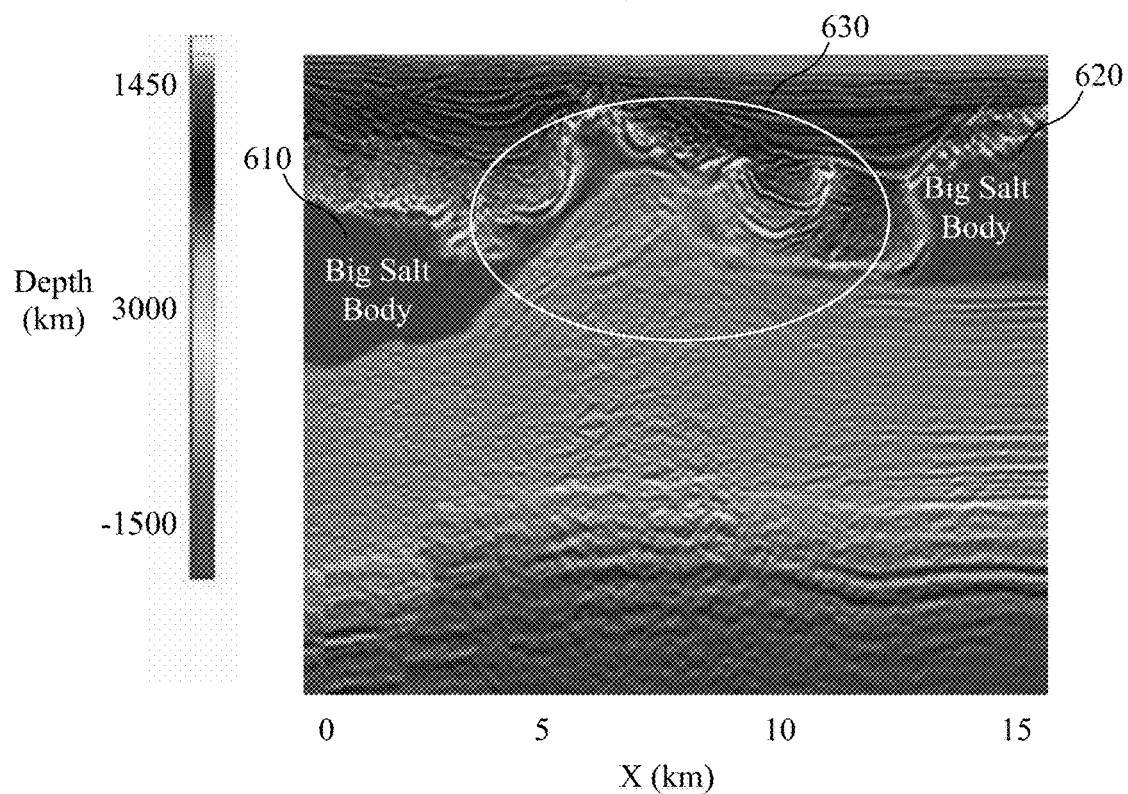
FIGS. 6A-6D are graphs illustrating the benefit of applying the $W^2$-based FWI according to an embodiment to real data.
Figure 6B:
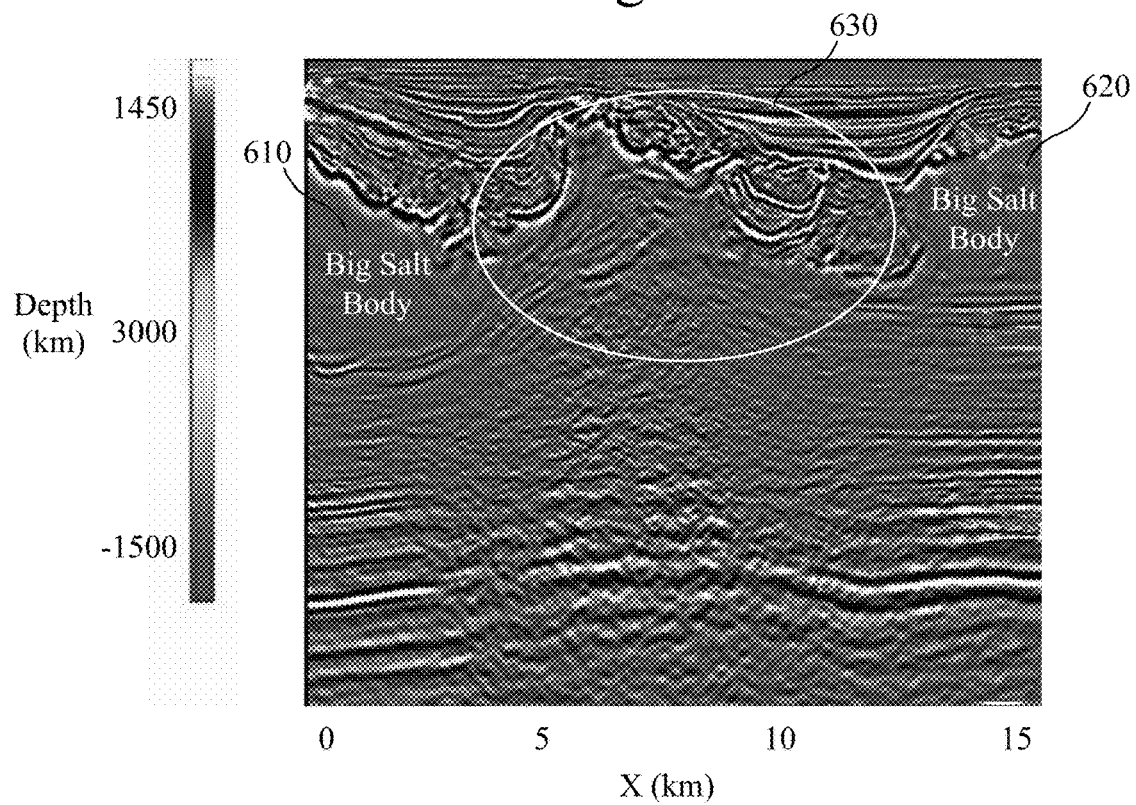

Similar to FIGS. 5A-5D, FIGS. 6A-6D are 2D graphs illustrating a test of $W^2$-based FWI applied to a real data test. The data was acquired with a staggered-vessel configuration, which provided full-azimuth coverage for offsets up to 10 km, and long offsets up to 18 km for certain azimuths. The explored geophysical structure includes salt bodies 610 and 620, and a complex salt geometry 630 in-between, which is difficult to image using $L^2$-based FWI. The initial velocity model illustrated in FIG. 6A was based on tomography and salt interpretation. FIG. 6B is the result of applying reverse time migration (RTM) to the initial velocity model in FIG. 6A.

Figure 6C:
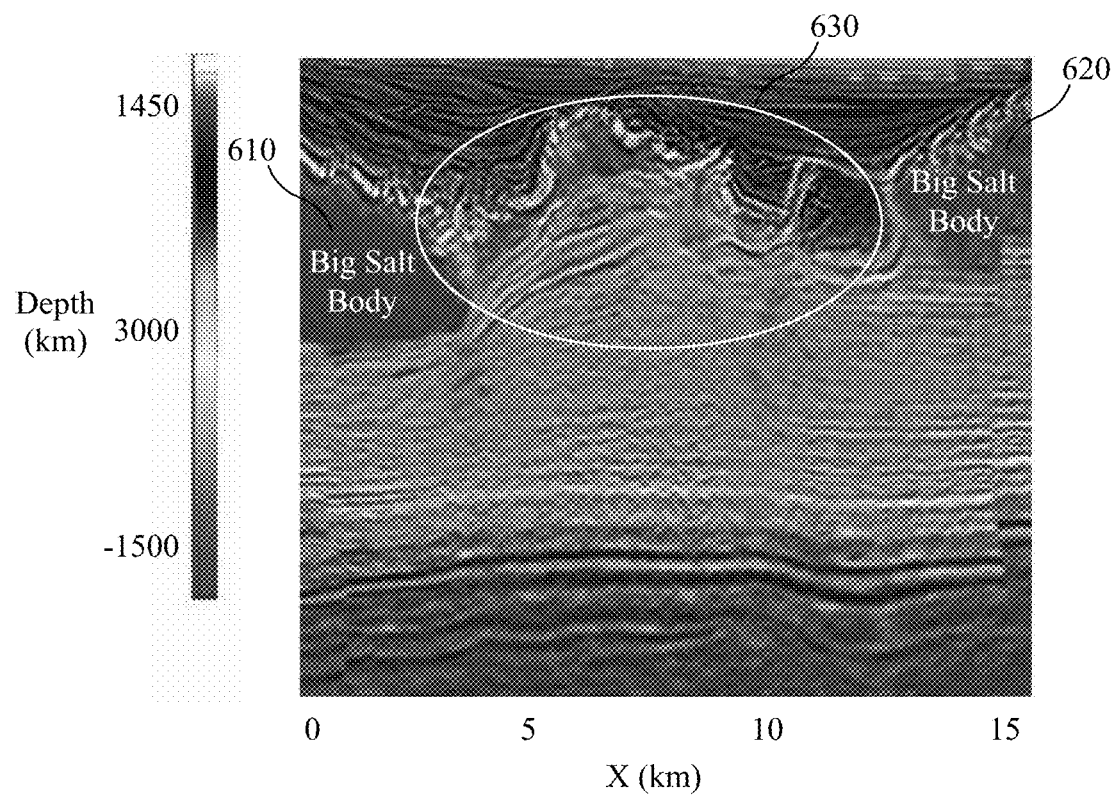
Figure 6D:
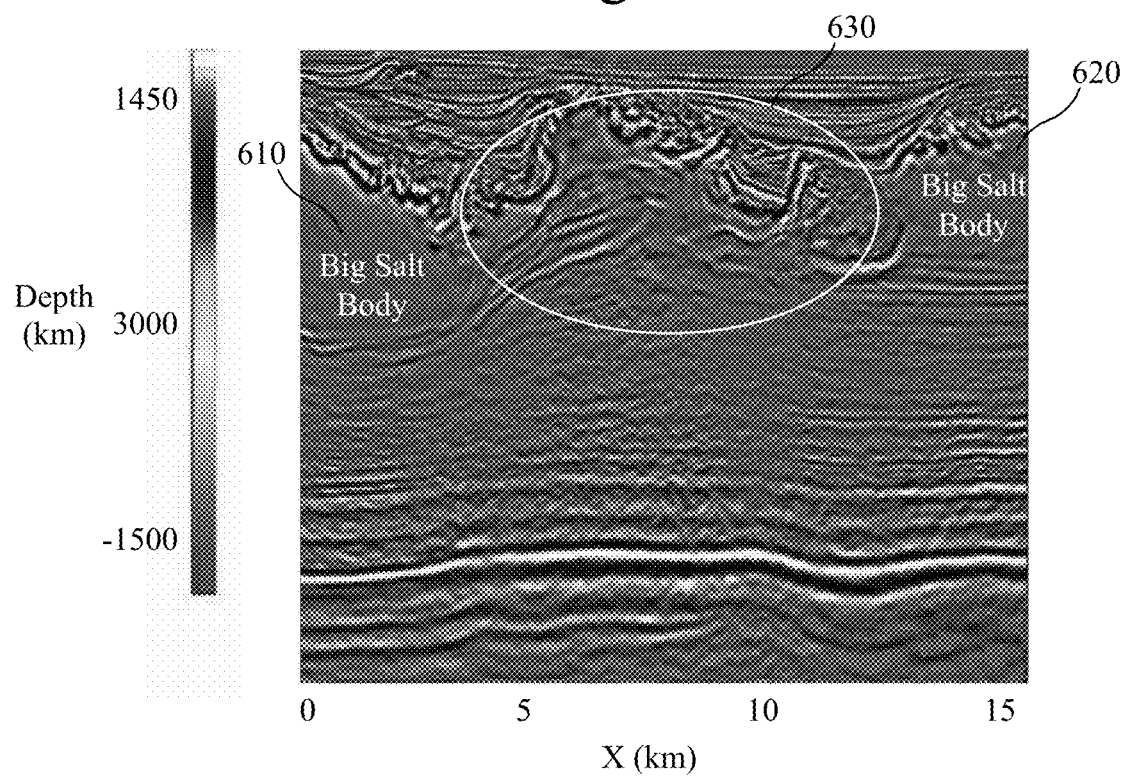

The FWI was carried out from 3 to 7 Hz. FIG. 6C illustrates the updated velocity model obtained by applying $W^2$-based FWI, and FIG. 6D is the result of applying RTM to the updated velocity model in FIG. 6C. Applying $W^2$-based FWI made significant corrections to the salt geometry and, as a result, the RTM image is much improved compared to the initial image, especially for the subsalt events.

FIG. 7 is a flowchart of a method 700 according to an embodiment. The method includes obtaining seismic acquired over the explored underground formation at 710. Method 700 then includes generating synthetic data based on a velocity model at 720 and transforming the synthetic data and the seismic data to be positive definite and have the same mass using adaptive normalization at 730. Method 700 further includes updating the velocity model using $W^2$-based FWI at 740. The updated velocity model is usable to determine the presence of natural resources in the explored underground formation.

Steps 720 to 740 may be performed iteratively until a loop-exit condition is met. The loop-exit condition may be one of a predetermined number of iterations, with the $W^2$-based cost function becoming lower than a predetermined threshold, a change of the $W^2$-based cost function becoming less than a convergence threshold, etc., and a combination of such conditions.

Step 730 (i.e., the transforming of the seismic data and the synthetic data) includes integrating wavefield and adaptive normalization. The adaptive normalization may be a linear normalization. The linear normalization may use a normalization constant (as in formula (6)) which is chosen to be as small as possible while the synthetic data and the seismic data remain positive definite. The underground formation may include a salt body.

In one embodiment, a subsurface model is generated based on the velocity model and other information, prior to generating the synthetic data.

Figure 8:
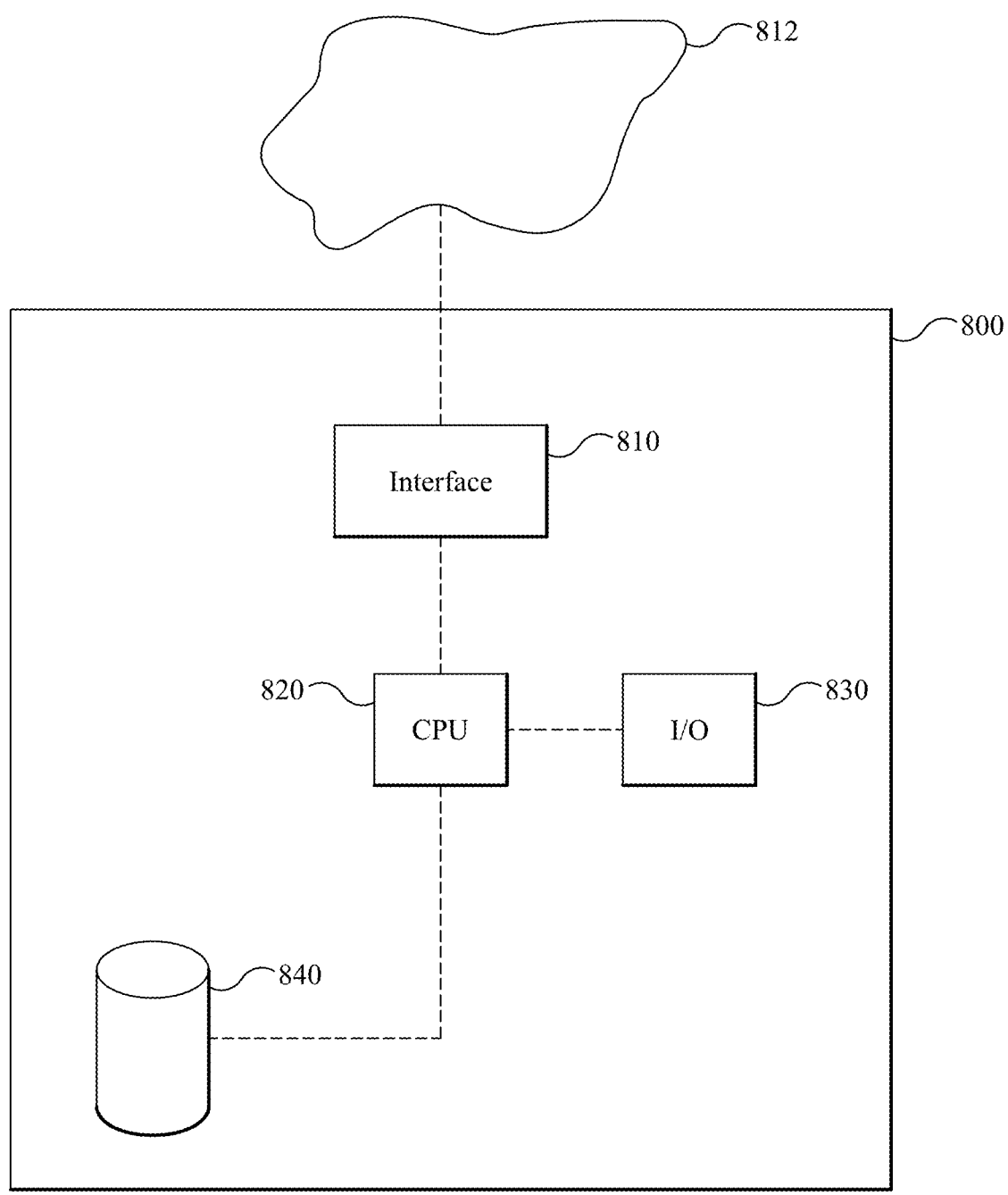
FIG. 8 is a block diagram of a seismic data processing apparatus according to an embodiment.

FIG. 8 is a block diagram of a seismic data processing apparatus 800 according to an embodiment. Apparatus 800 includes an interface 810, a CPU 820, a user interface 830 and a data storage device 840. Interface 810 is configured to obtain seismic data acquired for the underground structure from other devices or the data acquisition equipment (collectively labeled 812). The user interface, which is optional, may include a display and may allow a user to vary the conditions of performing methods according to various embodiments (for example, may input an initial normalization constant that is then automatically optimized).

CPU is configured to perform methods similar to method 700 described above. The CPU may include a software or hardware interface to a computer-readable recording medium such as the data storage device 840 or an external device. The computer-readable recording medium stores executable codes, which, when executed by the CPU, make the CPU perform methods similar to 700.

The CPU may be configured to perform iteratively (1) generating synthetic data based on the velocity model, (2) transforming the synthetic data and the seismic data, and (3) updating the velocity model by applying the $W^2$-based FWI to the transformed synthetic and seismic data, until a loop-exit condition (as already specified) is met.

When transforming the synthetic and seismic data, the CPU may integrate the wavefield and perform an adaptive normalization. The adaptive normalization may be a linear normalization. The linear normalization may use a normalization constant chosen to be as small as possible if the synthetic data and the seismic data remain positive definite.

In one embodiment the CPU may be configured to generate a subsurface model based on the velocity model and other information, prior to generating the synthetic data.

The disclosed embodiments provide methods and systems for seismic exploration of an underground structure using adaptive quadratic Wasserstein ($W^2$) FWI. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of seismic exploration of an underground structure using a Wasserstein metric-based full-wave inversion, FWI, the method comprising:
obtaining seismic data acquired over the explored underground structure;
generating synthetic data based on a velocity model;
transforming the synthetic data and the seismic data by integrating a difference between the synthetic and the seismic data along each trace to generate transformed synthetic data and corresponding to null transformed seismic data;
applying a linear normalization to traces of the transformed synthetic and the transformed seismic data using an adaptive normalization so that normalized corresponding traces to have same mass;
updating the velocity model by applying the Wasserstein metric-based FWI to the normalized corresponding traces of the transformed synthetic and seismic data; and
determining presence of natural resources in the explored underground structure based on the updated velocity model.

2. The method of claim 1, wherein the generating, the transforming, the applying of the linear normalization and the updating are performed iteratively until a loop-exit condition is met.

3. The method of claim 1, wherein the applying of the Wasserstein metric-based FWI includes computing a Frechet derivative of the synthetic data.

4. The method of claim 1, wherein a normalization constant used in the linear normalization is minimized while maintaining the normalized synthetic data and the normalized seismic data remaining positive definite.

5. The method of claim 1, wherein the underground formation includes a salt body.

6. The method of claim 1, further comprising generating a subsurface model based on the velocity model and other information, prior to generating the synthetic data.

7. The method of claim 1, wherein the transformed synthetic data $\tilde{f}$ and the transformed seismic data $\tilde{g}$ are $$\tilde{f}(t)=\int_0^t f(s)ds - \int_0^t g(s)ds, \ \tilde{g}(t)=0$$

with f corresponding to the synthetic data and g to the seismic data, and
the applying of the linear normalization is performed according to $$\hat{f} \equiv \frac{\tilde{f}+c}{\langle \tilde{f}+c \rangle}, \ \hat{g} \equiv \frac{\tilde{g}+c}{\langle \tilde{g}+c \rangle}$$

with normalization constant c ensuring that $\tilde{f}+c>0$ and $\tilde{g}+c>0$.

8. A seismic data processing apparatus configured to perform seismic exploration of an underground structure using a Wasserstein metric-based full-wave inversion, FWI, the apparatus comprising:
an interface configured to obtain seismic data acquired over the explored underground structure; and
a data processing unit connecting to the interface and configured
to generate synthetic data based on a velocity model;
to transform the synthetic data and the seismic data by integrating a difference between the synthetic and the seismic data along each trace to generate transformed synthetic data corresponding to null transformed seismic data;
to apply a linear normalization to traces of the transformed synthetic data and the transformed seismic data using an adaptive normalization so that normalized corresponding traces to have same mass;
to update the velocity model by applying the Wasserstein metric-based FWI using the normalized corresponding traces of the transformed synthetic and of the seismic data; and
to determine presence of natural resources in the explored underground structure based on the updated velocity model.

9. The seismic data processing apparatus of claim 8, wherein the data processing unit performs iteratively generating the synthetic data based on the velocity model, transforming the synthetic data and the seismic data, applying the linear normalization, and updating the velocity model by applying the $W^2$-based FWI to the normalized corresponding traces of the synthetic and seismic data, until a loop-exit condition is met.

10. The seismic data processing apparatus of claim 8, wherein, when applying of the Wasserstein metric-based FWI, the data processing unit computes a Frechet derivative of the synthetic data.

11. The seismic data processing apparatus of claim 8, wherein a normalization constant used in the linear normalization is minimized while maintaining the normalized synthetic data and the normalized seismic data remain positive definite.

12. The seismic data processing apparatus of claim 8, wherein the underground formation includes a salt body.

13. The seismic data processing apparatus of claim 8, wherein the data processing unit generates a subsurface model based on the velocity model and other information, prior to generating the synthetic data.

14. The seismic data processing apparatus of claim 8, wherein the transformed synthetic data $\tilde{f}$ and the transformed seismic data $\tilde{g}$ are $$\tilde{f}(t)=\int_0^t f(s)ds - \int_0^t g(s)ds, \ \tilde{g}(t)=0$$

with f corresponding to the synthetic data and g to the seismic data, and
the applying of the linear normalization is performed according to $$\hat{f} \equiv \frac{\tilde{f}+c}{\langle \tilde{f}+c \rangle}, \ \hat{g} \equiv \frac{\tilde{g}+c}{\langle \tilde{g}+c \rangle}$$

with normalization constant c ensuring that $\tilde{f}+c>0$ and $\tilde{g}+c>0$.

15. A computer readable storage medium storing executable codes, which, when executed by a processor, make the processor perform a method of seismic exploration of an underground structure using a Wasserstein metric-based full-wave inversion, FWI, the method comprising:
obtaining seismic data acquired over the explored underground structure;
generating synthetic data based on a velocity model;
transforming the synthetic data and the seismic data by integrating a difference between the synthetic and the seismic data along each trace to generate transformed synthetic data corresponding to null transformed seismic data;

applying a linear normalization to traces of the transformed synthetic and the transformed seismic data using an adaptive normalization so that normalized corresponding traces to have same mass;

updating the velocity model by applying the Wasserstein metric-based FWI to the normalized corresponding traces of the transformed synthetic and seismic data; and determining presence of natural resources in the explored underground structure based on the updated velocity model.

16. The computer readable storage medium of claim 15, wherein the generating, the transforming, the applying of the linear normalization and the updating are performed iteratively until a loop-exit condition is met.

17. The computer readable storage medium of claim 15, wherein the applying of the Wasserstein metric-based FWI includes computing a Frechet derivative of the synthetic data.

18. The computer readable storage medium of claim 15, wherein a normalization constant used in the linear normalization is minimized while maintaining the normalized synthetic data and the normalized seismic data remain positive definite.

19. The computer readable storage medium of claim 15, wherein the underground formation includes a salt body.

20. The computer readable storage medium of claim 15, wherein the transformed synthetic data $\tilde{f}$ and the transformed seismic data $\tilde{g}$ are $$\tilde{f}(t)=\int_0^t f(s)ds - \int_0^t g(s)ds, \ \tilde{g}(t)=0$$

with f corresponding to the synthetic data and g to the seismic data, and the applying of the linear normalization is performed according to $$\hat{f} \equiv \frac{\tilde{f}+c}{\langle \tilde{f}+c \rangle}, \ \hat{g} \equiv \frac{\tilde{g}+c}{\langle \tilde{g}+c \rangle}$$

with normalization constant c ensuring that $\tilde{f}+c>0$ and $\tilde{g}+c>0$.

* * * * *